United States Patent [19]

Chen et al.

[11] Patent Number: 5,579,631

[45] Date of Patent: Dec. 3, 1996

[54] STEAM COOLING OF GAS TURBINE WITH BACKUP AIR COOLING

[75] Inventors: Allen G. Chen, Turkey Lake; Robert K. Scott, Casselberry; Scott T. Cloyd, Lake Mary, all of Fla.

[73] Assignee: Westinghouse Electric Corporation, Pittsburgh, Pa.

[21] Appl. No.: 234,040

[22] Filed: Apr. 28, 1994

[51] Int. Cl.[6] .................................................... F02C 3/30
[52] U.S. Cl. ........................ 60/39.05; 60/39.3; 60/39.59
[58] Field of Search ........................... 60/39.05, 39.182, 60/39.3, 39.53, 39.54, 39.58, 39.59

[56] References Cited

U.S. PATENT DOCUMENTS

| | | | |
|---|---|---|---|
| 3,729,930 | 5/1973 | Williams | 60/39.58 |
| 4,338,580 | 7/1982 | Sakamoto et al. | 60/39.05 |
| 4,631,914 | 12/1986 | Hines | 60/39.05 |
| 4,991,391 | 2/1991 | Kosinski | 60/39.182 |
| 5,340,274 | 8/1994 | Cunha | 60/39.05 |

FOREIGN PATENT DOCUMENTS

| | | |
|---|---|---|
| 1170842 | 7/1984 | Canada . |
| 0417940A1 | 3/1991 | European Pat. Off. . |
| 0543627A1 | 5/1993 | European Pat. Off. . |
| 2228295A | 8/1990 | United Kingdom . |
| 2236145 | of 1991 | United Kingdom . |

*Primary Examiner*—Louis J. Casaregola
*Attorney, Agent, or Firm*—M. G. Panian

[57] ABSTRACT

A gas turbine power plant in which a mixture of steam and compressed air, the mixture being primarily steam, is used to cool the rotating blades and stationary vanes in the turbine section. The air is bled from the compressor. The flow rate of steam that is mixed into the compressed air is adjusted so as to maintain the pressure drop experienced by the compressed air as it flows to the turbine within a predetermined range. Consequently, the steam and air mixture has the same volumetric flow rate as if compressed air alone were being used. Thus, any sudden decrease in steam flow rate will automatically result in an offsetting increase in the flow of compressed air due to the decrease in the line pressure in the common line through which the air and steam flow to the turbine. Consequently, no control, isolation or check valves are utilized in the compressed air piping.

22 Claims, 4 Drawing Sheets

5,579,631

STEAM COOLING OF GAS TURBINE WITH BACKUP AIR COOLING

BACKGROUND OF THE INVENTION

The present invention relates to a method and apparatus for cooling the turbine section of a gas turbine. More specifically, the present invention relates to a method and apparatus for steam cooling a turbine without the danger of over-heating the turbine if the steam supply is cut-off.

A gas turbine is typically comprised of a compressor section that produces compressed air that is subsequently heated by burning fuel in a combustor. The hot gas from the combustor is directed to a turbine section where the hot gas is used to drive a rotor shaft to produce power.

The turbine section typically employs a plurality of alternating rows of stationary vanes and rotating blades. Since the vanes and blades are exposed to the hot gas discharging from the combustor, cooling these components is of the utmost importance. Traditionally, cooling was accomplished by bleeding compressed air produced in the compressor and directing it to the turbine so that the cooling air bypassed the combustor. Depending on the application, the bleed air was sometimes cooled in an air-to-air cooler prior to introducing it into the turbine.

After introduction into the turbine, the cooling air flowed through radial passages formed in the airfoil portions of the vanes and blades. Typically, a number of small axial passages were formed inside the vane and blade airfoils that connected with one or more of the radial passages so that cooling air was directed over the surfaces of the airfoils, such as the leading and trailing edges or the suction and pressure surfaces. After the cooling air exited the vane or blade it entered and mixed with the hot gas flowing through the turbine section.

Unfortunately, this traditional cooling approach has a detrimental impact on the thermal efficiency of the gas turbine. Although the cooling air eventually mixes with the hot gas expanding in the turbine, since it bypasses the combustion process the work recovered from the expansion of the compressed cooling air is much less than that recovered from the expansion of the compressed air heated in the combustor. In fact, as a result of losses due to pressure drop and mechanical efficiency, the work recovered from the cooling air is less than that required to compress the air in the compressor. Thus, it would be desirable to cool the vanes and blades without the use of compressed air bled from the compressor.

One approach suggested in the past has been to replace the compressed air with steam generated from exhaust heat. Unfortunately, under this approach, any interruption of the steam supply could have disastrous results due to the rapidity with which the turbine section can over-heat. Although compressed air from the compressor could be used as a backup source of air, when the supply of such air to the turbine is conventionally regulated by means of an isolation valve, the danger exists that such valve may malfunction or not respond sufficiently quickly to prevent over-heating of the turbine. Moreover, in order to ensure that steam does not inadvertently enter the compressor and damage the components therein, the conventional approach also requires a check valve in the compressed air piping. Again, the existence of this valve creates the danger that a valve malfunction will deprive the turbine of cooling in the event of an interruption in the steam supply or permit steam to enter the compressor.

It is therefore desirable to provide an extremely reliable method and apparatus for utilizing steam to cool the turbine section of a gas turbine.

SUMMARY OF THE INVENTION

Accordingly, it is the general object of the current invention to provide an extremely reliable method and apparatus for utilizing steam to cool the turbine section of a gas turbine.

Briefly, this object, as well as other objects of the current invention, is accomplished in a method of cooling in a gas turbine power plant, comprising the steps of (i) compressing air in a compressor, thereby producing compressed air, (ii) heating a first portion of the compressed air by burning a fuel therein in a combustor, thereby producing a hot compressed gas, (iii) flowing the hot compressed gas through a turbine so as to expand the hot compressed gas, thereby producing an expanded gas and power, (iv) directing a second portion of the compressed air to the turbine, whereby the second portion of the compressed air bypasses the combustor, and introducing the second portion of the compressed air into the turbine for cooling thereof, and (v) mixing a flow of steam into the second portion of the compressed air prior to the introduction of the second portion of the compressed air into the turbine, whereby a mixture of steam and air is introduced into the turbine.

In one embodiment, the method further comprises the step of regulating the flow rate of the second portion of the compressed air by regulating the flow rate of the steam mixed therein. In this embodiment, the step of directing the second portion of the compressed air to the turbine comprises causing the second portion of the compressed air to undergo a drop in pressure and the step mixing the flow of steam into the second portion of the compressed air comprises adjusting the rate of the steam flow as a function of the pressure drop.

The current invention also encompasses a gas turbine power plant, comprising (i) a compressor for producing compressed air, (ii) a combustor for heating a first portion of the compressed air by burning a fuel therein, thereby producing a hot compressed gas, (iii) a turbine for expanding the hot compressed gas, thereby producing an expanded gas, the turbine having a plurality of cooling passages formed therein, (iv) means for directing a second portion of the compressed air to the turbine, whereby the second portion of the compressed air bypasses the combustor, and for introducing the second portion of the compressed air into the turbine cooling passages, and (v) means for mixing a flow of steam into the second portion of the compressed air prior to the introduction of the second portion of the compressed air into the turbine, whereby a mixture of steam and air is introduced into the turbine.

DESCRIPTION OF THE PREFERRED EMBODIMENT

Figure 1:
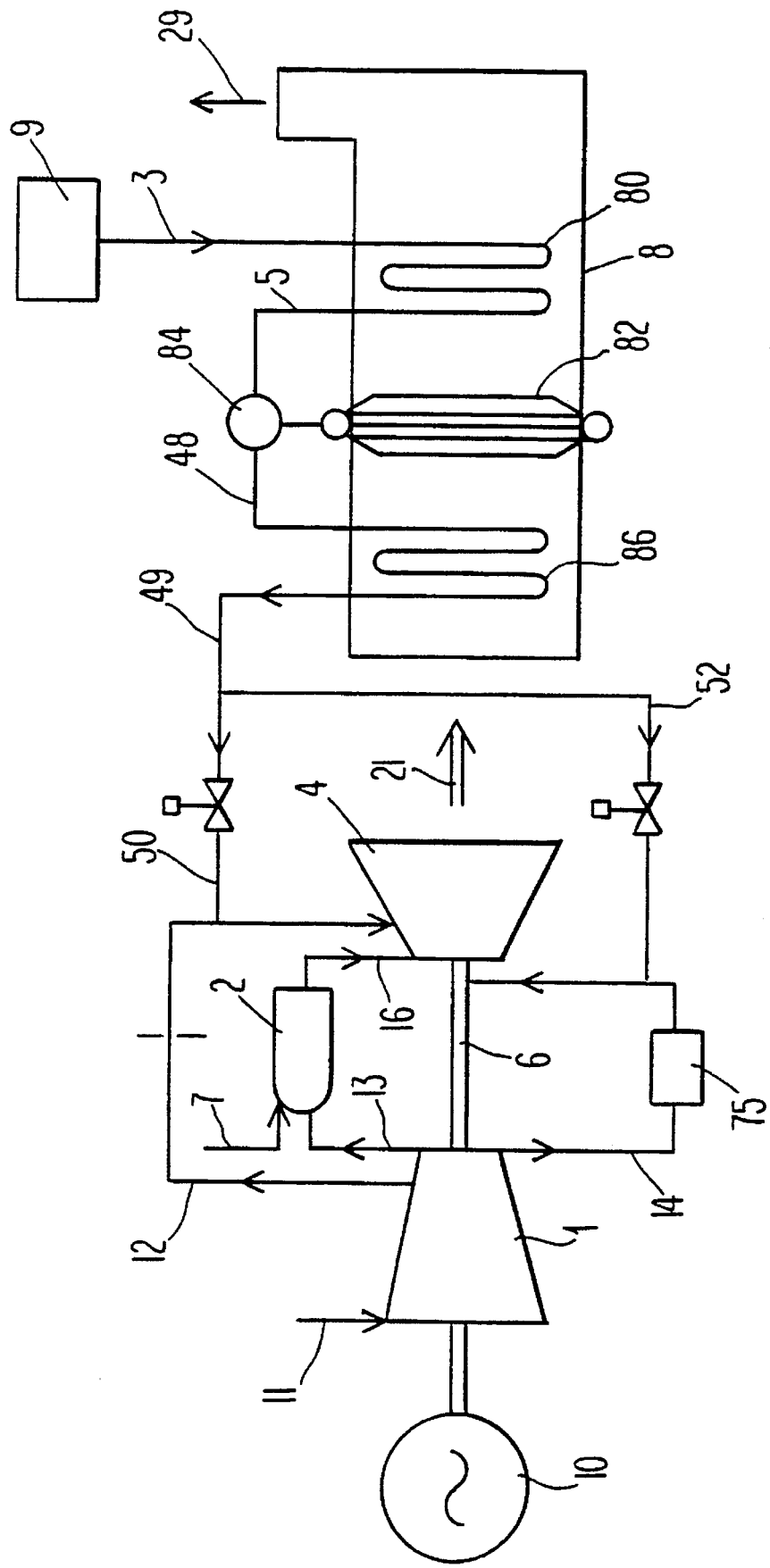
FIG. 1 is a schematic diagram of a gas turbine power plant embodying the steam/air cooling scheme of the current invention.

Referring to the drawings, there is shown in FIG. 1 a schematic diagram of the gas turbine power plant according to the current invention. The major components of the plant include a compressor 1, a combustor 2, a turbine 4, a rotor 6, a heat recovery steam generator 8 ("HRSG"), a feed water supply 9 and an electrical generator 10.

In operation, ambient air 11 is drawn into the compressor 1. The compressed air 13 from the compressor 1 is then directed to the combustor 2, in which a fuel 7, which is typically oil or natural gas, is burned to produce a hot compressed gas 16. In a modern gas turbine, the hot compressed gas discharging from the combustor 2 may be in excess of 1370° C. (2500° F.). The hot compressed gas 16 is then directed to the turbine section 4, where it is expanded so as to produce an expanded gas 21 and generate power to drive the rotor 6. The rotor 6 drives the compressor 1 and the electric generator 10 that produces electrical power.

Figure 2:
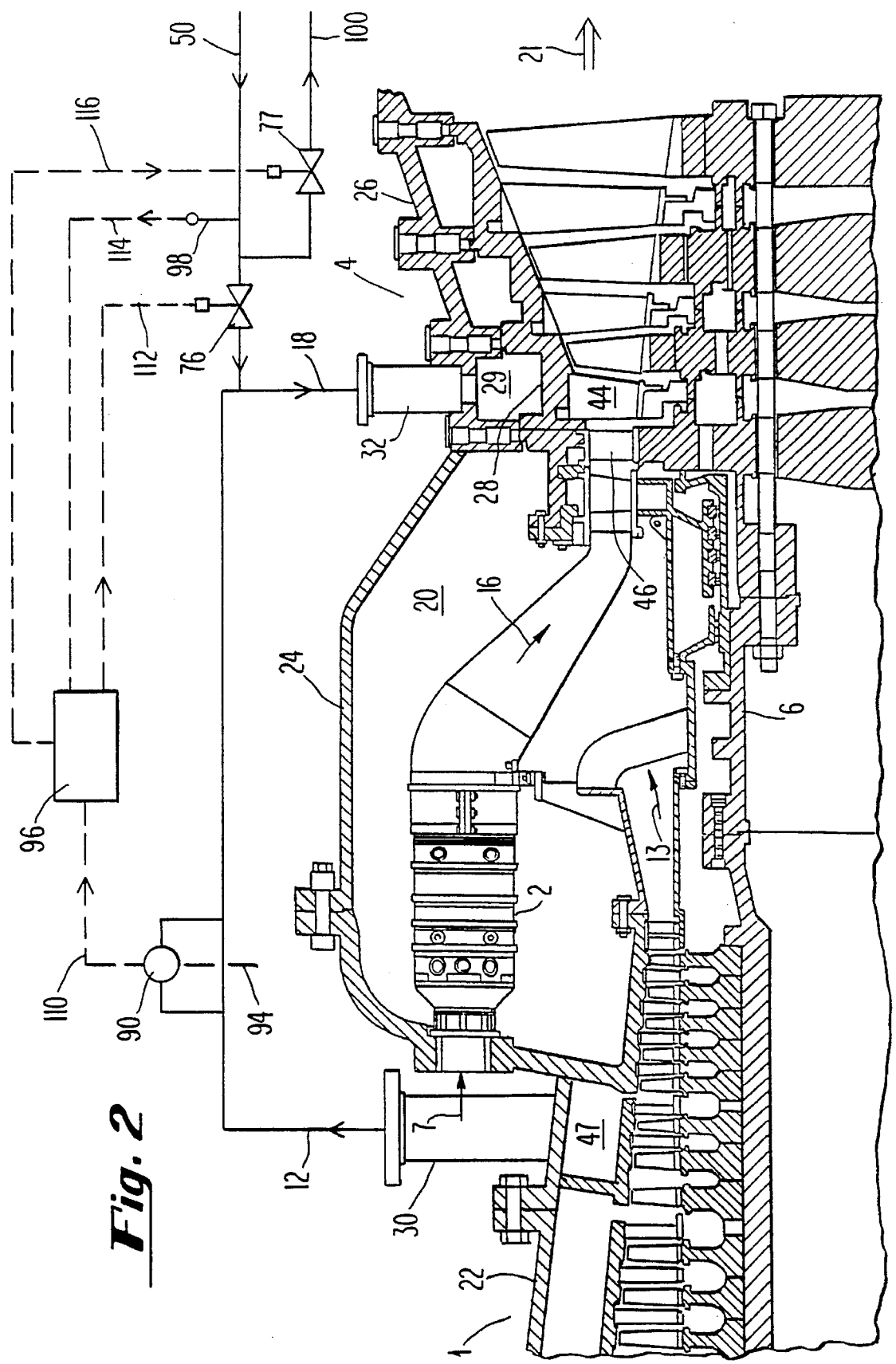
FIG. 2 is a portion of longitudinal cross-section through the gas turbine shown in FIG. 1, with the row 2 vane cooling scheme of the current invention shown schematically.

As shown in FIG. 2, the compressor 1 is comprised of a plurality of rows of stationary vanes affixed to a compressor cylinder 22 and rotating blades affixed to discs mounted on the compressor portion of the rotor 6. The compressed air 13 discharged from the compressor 1 is directed to a chamber 20 formed by a combustion section cylinder 24. From the chamber 20, a portion of the compressed air 13 enters the combustors 2 (only one of which is shown in FIG. 2) and is heated by the combustion of fuel 7, as previously discussed.

From the combustors 2, the hot gas 16 is directed by ducts 17 to the turbine section 4. The turbine 4 is comprised of an outer cylinder 26 that encloses an inner cylinder 28. Within the inner cylinder, the hot gas 16 flows over alternating rows of stationary vanes and rotating blades. The rows of stationary vanes are affixed to the inner cylinder 28. The rows of rotating blades are affixed to discs that form the turbine portion of the rotor 6. Although the current invention is illustrated in detail herein with reference to cooling the first stage blade 46 and the second stage vane 44, it should be understood that the invention is equally applicable to cooling other rows of turbine blades and vanes, as well as to cooling the turbine discs.

Returning to FIG. 1, the expanded gas 21 discharged from the turbine 4, although its temperature has been reduced in flowing through the turbine, is still relatively hot—typically at least 480°–540° F. (900°–1000° F.). According to a preferred embodiment of the current invention, the expanded gas 21 is directed to the HRSG 8.

The HRSG 8 comprises a duct that encloses various heat transfer sections, such as a superheater 86, an evaporator 82 and a economizer 80. After transferring heat from the expanded gas 21 to feed water 3 so as to generate superheated steam 49, as discussed below, the expanded gas 29, now considerably cooled, is vented to atmosphere.

A pump (not shown) directs feed water 3 from a feed water supply 9 to the HRSG 8. In the HRSG 8, the feed water 3 flows through the economizer 80, in which heat is transferred to the feed water from the expanded gas 21. From the economizer 80, the heated feed water 5 is directed to a steam drum 84, from which it is circulated through the evaporator 82 and converted to steam 48. The saturated steam 48 from the drum 84 is then superheated in the superheater 86. The superheated steam 49 is then split into two streams 50 and 52. Steam stream 50 is directed to the turbine 4 for cooling the stationary vanes 44 and steam stream 52 is directed to the turbine 4 for cooling the rotor 6 and its rotating blades 46, as discussed in detail below.

Referring to FIG. 2, the cooling scheme for the turbine vanes 44 will now be discussed. Partially compressed air 12 is bled from a stage part-way through the compressor 1 and collected in a manifold 47 formed by the compressor cylinder 22. The compressed air 12 is directed from the manifold by a pipe 30, in which an orifice 94 is disposed. From the orifice 94 the compressed air is combined with the steam 50 from the HRSG 8. As a result of flowing through the orifice 94, the compressed air 12 experiences a reduced drop that is proportional to its flow rate and that is utilized to regulate the flow rate of the steam 50 that is mixed into the compressed air 12, as discussed below. The mixture of steam and compressed air 18 is then directed by pipe 32, via a hole in the outer cylinder 26, into a manifold 29 formed between the inner and outer cylinders 28 and 26, respectively.

Figure 4:
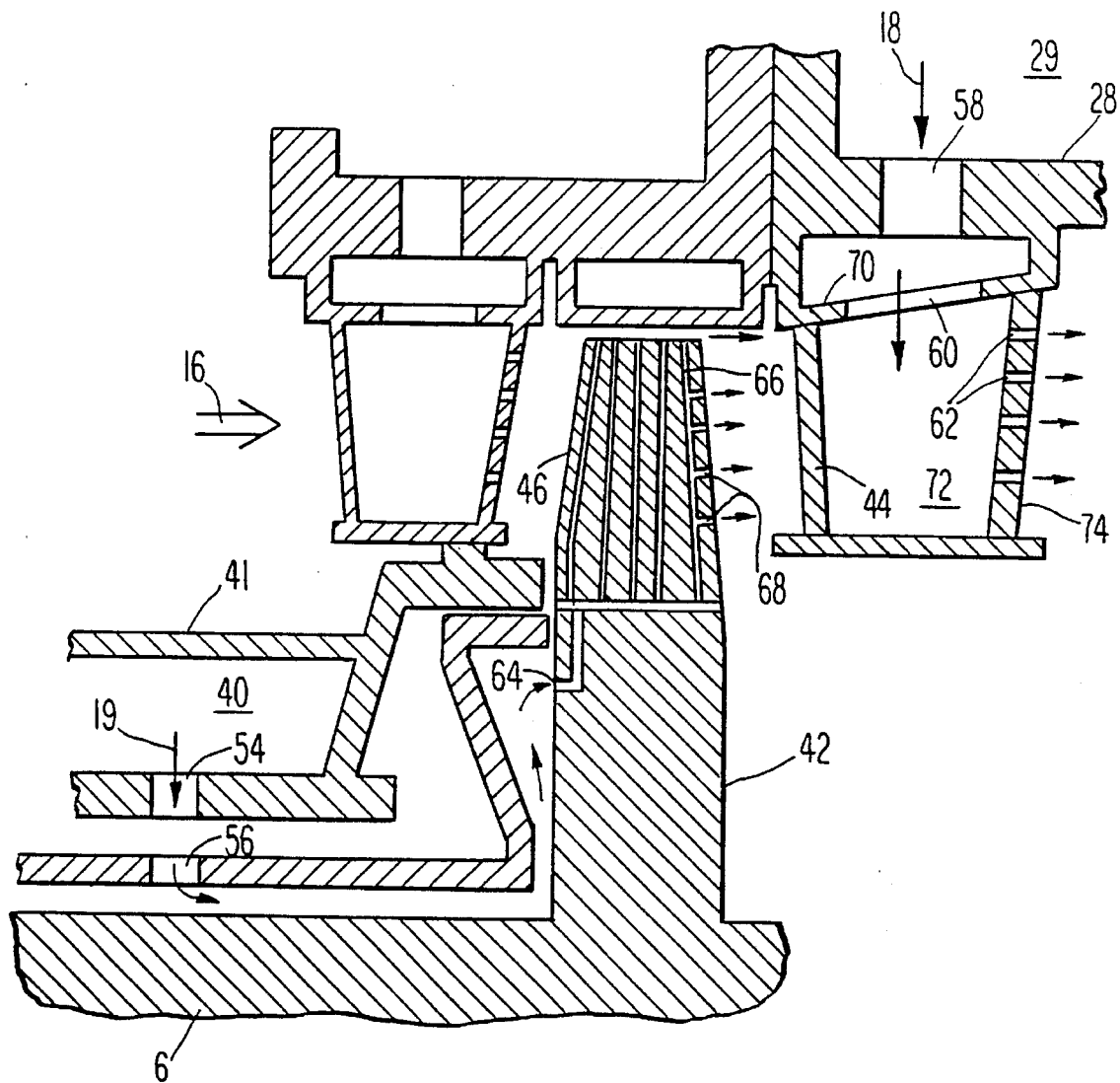
FIG. 4 is a simplified view of the cooling flow path through the vanes and blades of the gas turbine shown in FIG. 1.

Referring to FIG. 4, some of the details of the vane cooling flow path, which is conventional, will now be discussed. The mixture 18 of steam and air flows from the manifold 29 to the vanes 44 via a passage 58 in the inner cylinder 28. A passage 60 in the vane outer shroud 70 allows the steam/air mixture 18 to enter a central cavity 72 within the vane airfoil 74. From the cavity 72, the steam/air mixture flows through holes 62 in the trailing edge of the vane airfoil 74 and then mixes with the hot gas 16 flowing through the turbine 4. Those skilled in the art will readily appreciate that a more complex vane cooling scheme may be used—for example, by employing inserts in the cavity 72 or forming additional holes in the vane airfoil 74 so as to provide a film of coolant over the leading edge as well as the suction or pressure surfaces.

Returning to FIG. 2, according to an important aspect of the current invention, a differential pressure transducer 90 is connected to either side of the orifice 94 so that the pressure drop experienced by the compressed air 12 in flowing through the orifice is sensed. The transducer 90 generates an electrical signal 110 that is indicative of the pressure drop sensed and transmits it to a controller 96, which may be microprocessor based. The controller 96, using techniques well known in the art, contains logic for generating a control signal 112 responsive to the pressure drop sensed. The control signal 112 operates a control valve 76 that regulates the flow rate of steam 50 from the HRSG 8 that is mixed into the compressed air 12.

The pressure of the compressed air 12 will depend on the characteristics of the compressor 1, the precise location at which the air is bled, and the operating parameters (e.g., firing temperature of the turbine, ambient conditions, etc.). In any case, the pressure of the compressed air 12 will be more or less constant at any given operating condition. In a typical gas turbine operating at its rated base load firing temperature and in which air is bled from the eleventh stage of the compressor 1, the pressure of the compressed air 12 will be approximately 415 kPa (60 psia). By contrast, the HRSG 8 will be capable of generating steam 50 at much higher pressures (i.e., pressures in excess of 6895 kPa (1000 psia). Thus, recognizing that flow rate is a function of the pressure differential driving the flow, the flow rate of the compressed air 12 will depend on the pressure established by the steam flow 50 in the common piping 32 through which the steam and compressed air flow—that is, as the flow rate of the steam increases, the pressure drop from the compressor extraction point through to the orifice decreases, thereby decreasing the flow of compressed air through the orifice. At any given operating condition, the greater the flow of steam, the higher the pressure in the piping 32 and the lower the flow of compressed air 12. A reduction in the steam flow rate will decrease the pressure in piping 32 and result in an increase in the flow of compressed air 12.

According to the current invention, the control valve 76 is operated so as to regulate the flow rate of steam 50 such that the steam/air mixture 18 that cools the vanes 44 is primarily composed of steam, and most preferably, the steam/air mixture is at least 90% steam on a weight basis. This is accomplished by programming the controller 96 with logic such that the controller will operate the control valve 76 as required to maintain the pressure drop across the orifice 94, as sensed by the transducer 90, below a predetermined maximum value. For example, when the compressed air 12 is bled from the eleventh stage of the compressor, at which the pressure is 415 kPa (60 psia), the predetermined maximum value of the pressure drop across the orifice 94 is preferably approximately 21 kPa (3 psi).

The controller 96 is also programmed to ensure that the pressure drop across the orifice 94 is maintained positive at all times—that is, above a predetermined minimum value, for example 7 kPa (1 psi), so that the pressure downstream of the orifice 94 is always lower than the pressure upstream. Accordingly, there will always be a flow of compressed air 12 into the turbine 4. This ensures that steam 50 will not flow upstream and enter the compressor 1, which could damage the components therein. Therefore, according to the current invention, a check valve need not be installed in the compressed air piping in order to preclude the back-flow of steam into the compressor 1.

Thus, the controller is programmed with logic, using techniques well known in the art, that cause it to operate the control valve 76 so as to regulate the flow of steam 50 such that the pressure drop across the orifice 94 will be maintained within a predetermined range—i.e., from 7 to 21 kPa (1 to 3 psi) in the example. If the pressure drop decreases below the predetermined minimum, the controller 96 will begin closing the valve 76 so as to reduce the flow of steam 50 and, hence, increase the flow of compressed air 12 by decreasing the pressure in the common piping 32 against which the compressed air 12 must flow in order to enter the turbine 4. If the pressure drop increases above the predetermined maximum, the controller 96 will begin opening the valve 76 so as to increase the flow of steam 50 and, hence, reduce the flow of compressed air 12 by increasing the pressure in the common piping 32 against which the compressed air 12 must flow in order to enter the turbine 4.

Thus, according to the current invention, the flow of compressed air 12 is regulated by adjusting the flow of steam 50 mixed into the air and the flow rate of steam 50 will automatically and continually be adjusted, as required, as a result of variations in the operating parameters. For example, an increase in the turbine firing temperature will increase the back pressure to which the compressor 1 is subjected and, hence, will increase in the pressure of the compressed air 12. This increase in air pressure will result in a momentary increase in the flow rate of the compressed air and, hence, the pressure drop across the orifice 94. However, this increase in pressure drop will, under the action of the controller 96 and the control valve 76 as previously discussed, result in an increase in the flow rate of the steam 50 sufficient to return the pressure drop and, hence, the flow rate of compressed air 12, to the desired amount.

The current invention allows making use of steam 50 as the primary coolant so that the amount of compressed air 12 bled from the compressor 1 is kept to a minimum, thereby improving thermodynamic performance. Also, since, according to the current invention, the steam 50 that flows through the vanes 44 ultimately enters the hot gas 16 flowing through the turbine 4, as previously discussed, the mass flow of the working fluid expanded in the turbine 4 is increased, thereby further increasing the power output of the gas turbine 1.

Moreover, although the steam 50 is relied on as the primary coolant, the compressed air 12 from the compressor 1 is continuously and immediately available to handle the entire cooling duty during start-up, when the HRSG 8 has not yet begun to produce steam, or in the event of an interruption in the flow of steam during operation. According to the current invention, a sudden drop in the steam flow rate will cause a sudden drop in the pressure in piping 32 and, hence, an immediate increase in the flow rate of compressed air 12. Significantly, this use of compressed air as a backup to the steam is accomplished without the need to actuate any valves. In fact, in the preferred embodiment, there are no valves whatsoever (i.e., neither a flow control valve, an isolation valve or a check valve) in the piping that directs the compressed air 12 from the compressor 1 to the turbine 4. Thus, there is no danger of turbine over-heating due to a valve malfunction.

During the initial supply of steam 50 to the turbine 4, the piping through which the steam must flow will be at ambient temperature. Although, in the preferred embodiment, the steam 50 is superheated, there is a danger that the steam may condense, causing water to enter the turbine. Since this situation can result in damage to the turbine components, according to the current invention, a vent line 100 is connected to the piping directing the steam 50 to the turbine 4, as shown in FIG. 2. A valve 77, operated by the controller 96, allows the steam 50 to be vented until the steam piping has reached a predetermined temperature.

In the preferred embodiment, a thermocouple 98 is installed so as to measure the metal temperature of the piping directing the steam 50 to the turbine 4. The controller receives the output signal 114 from the thermocouple 98 and is programmed with logic that causes it to generate a control signal 116 that will keep the vent valve 77 open, and the control valve 76 closed, until the piping has reached the desired minimum temperature to ensure that condensation will not occur.

Figure 3:
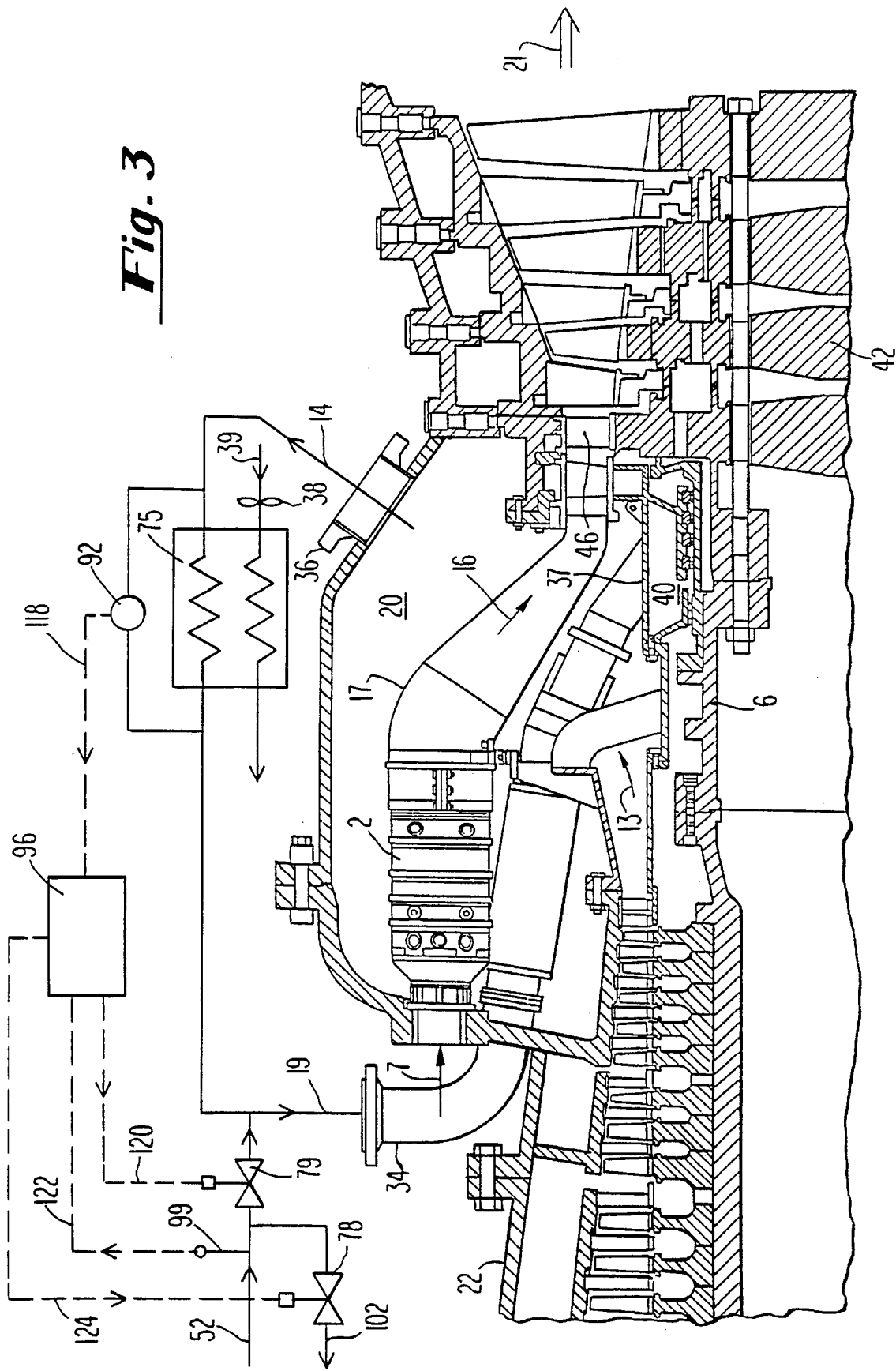
FIG. 3 is a portion of longitudinal cross-section through a gas turbine shown in FIG. 1, with the rotor blade cooling scheme of the current invention shown schematically.

Referring to FIG. 3, the cooling scheme for the turbine blades will now be discussed. As shown in FIG. 3, a portion 14 of the compressed air 13 discharged from the compressor 1 is directed from the chamber 20 by a pipe 36. As is conventional, the pipe 36 directs the compressed air 14 through a cooler 75, which may be of the finned tube type with the compressed air 14 flowing through the tubes. A fan 38 forces ambient air 39 over the tubes and cools the compressed air 14. According to an important aspect of the invention, as a result of flowing through the cooler 75 the compressed air 14 experiences a drop in pressure that is proportional to its flow rate and that is utilized to regulate the flow rate of the steam 52 that is mixed into the compressed air 14, as discussed below.

From the cooler 75 the compressed air 14 is combined with the steam 52 from the HRSG 8. The mixture of steam and compressed air 19 is then directed by pipe 34 to a manifold 40 formed by a housing 37 that encircles a portion of the rotor 6.

Referring to FIG. 4, some of the details of the blade cooling flow path, which is conventional, will now be discussed. The mixture 19 of steam and air flows from the manifold 40 to the blades 46 via passages 64 in the disc 42 to which the blades are attached. Radial passages 66 in the blade 46 allow the steam/air mixture 19 to flow through the blade. From the passages 66, the steam/air mixture 19 flows either out of the tip of the blade 46 or through axial holes 68 in the trailing edge. In either case, the steam/air mixture 19 mixes with the hot gas 16 flowing through the turbine 4. Those skilled in the art will readily appreciate that a more complex disc and blade cooling scheme may be used—for example, by employing a more complex flow path within the blade or by forming additional holes so as to provide a film of coolant over the leading edge as well as the suction or pressure surfaces.

Returning to FIG. 3, it can be seen that, according to the current invention, the steam cooling of the turbine blades is performed in a manner similar to that of the vane cooling discussed above. A transducer 92 senses the pressure drop across the cooler 75 and transmits a representative signal 118 to the controller 96. The controller 96 generates a control signal 120 that operates a control valve 79 such that the pressure drop across the cooler 75 is maintained within a predetermined range—for example, from 2.5 to 5 cm (1 to 2 inches) of water. Thus, the steam/air mixture 19 supplied to the rotor 6 is composed primarily of steam 52. As before, the flow rate of steam 52 that is mixed into the compressed air 14 will be continuously adjusted as the operation of the gas turbine varies and the compressed air 14 will be immediately available as a backup source of coolant in the event of an interruption in the flow of steam. Moreover, no valves are installed in the airflow piping so that there in no danger of overheating the turbine blades or rotor due to a valve malfunction. Lastly, a thermocouple 99 in the piping generates a signal 122 for the controller that causes it, via control signal 124, to maintain a vent valve 78 open until the temperature of the piping reaches a predetermined minimum to prevent condensation from entering the turbine 4.

Although the current invention has been illustrated by reference to a heat recovery steam generator as the source of steam, the invention may also be utilized with other steam sources, such as an auxiliary boiler or extraction steam from a steam turbine. Accordingly, the current invention may be embodied in other specific forms without departing from the spirit or essential attributes thereof and, accordingly, reference should be made to the appended claims, rather than to the foregoing specification, as indicating the scope of the invention.

We claim:

1. A method of cooling in a gas turbine power plant, comprising the steps of:
    a) compressing air in a compressor, thereby producing compressed air;
    b) heating a first portion of said compressed air by burning a fuel therein in a combustor, thereby producing a hot compressed gas;
    c) flowing said hot compressed gas through a turbine so as to expand said hot compressed gas, thereby producing an expanded gas and power;
    d) directing a second portion of said compressed air to said turbine, whereby said second portion of said compressed air bypasses said combustor, causing said second portion of compressed air to undergo a drop in pressure, and introducing said second portion of said compressed air into said turbine for cooling thereof; and
    e) mixing a flow of steam into said second portion of said compressed air prior to said introduction of said second portion of said compressed air into said turbine, adjusting the rate of said steam flow as a function of said pressure drop that said second portion of compressed air undergoes, whereby a mixture of steam and air is introduced into said turbine.

2. The cooling method according to claim 1, wherein said drop in pressure of said second portion of said compressed air is a function of the flow rate of said second portion of said compressed air.

3. The cooling method according to claim 2, wherein the step of adjusting said rate of said steam flow as a function of said pressure drop comprises:
    a) sensing the quantity of said pressure drop; and
    b) adjusting the rate of said steam flow so as to maintain said pressure drop within a predetermined range.

4. The cooling method according to claim 2, wherein the step of causing said second portion of said compressed air to undergo a drop in pressure comprises flowing said compressed air through an orifice.

5. The cooling method according to claim 2, wherein the step of causing said second portion of said compressed air to undergo a drop in pressure comprises flowing said compressed air through a cooler, said pressure drop occurring across said cooler.

6. The cooling method according to claim 5, wherein the step of adjusting said rate of said steam flow as a function of said pressure drop comprises sensing the quantity of said pressure drop occurring across said cooler.

7. The cooling method according to claim 1, further comprising the step of flowing said mixture of steam and air introduced into said turbine through a plurality of cooling passages formed therein.

8. The cooling method according to claim 7, further comprising the step of discharging said mixture of steam and air into said hot compressed gas flowing through said turbine after said mixture has flowed through said cooling passages.

9. The cooling method according to claim 1, wherein said steam forms at least 90% of said mixture of steam and air on a weight basis.

10. The cooling method according to claim 1, further comprising the step of generating said flow of steam by transferring heat from said expanded gas to water.

11. The cooling method according to claim 1, further comprising the steps of:
    a) directing said flow of steam to said second portion of said compressed air for mixing therein by flowing said steam through a pipe; and
    b) circulating steam through said pipe so as to heat said pipe prior to directing said flow of steam to said second portion of said compressed air through said pipe.

12. A gas turbine power plant comprising:
    a) a compressor for producing compressed air;
    b) a combustor for heating a first portion of said compressed air by burning a fuel therein, thereby producing a hot compressed gas;
    c) a turbine for expanding said hot compressed gas, thereby producing an expanded gas, said turbine having a plurality of cooling passages formed therein;
    d) means for directing a second portion of said compressed air to said turbine, whereby said second portion of said compressed air by passes said combustor, and means for introducing said second portion of said compressed air into said turbine cooling passages;
    e) means for mixing a flow of steam into said second portion of said compressed air prior to said introduction of said second portion of said compressed air into said turbine, whereby a mixture of steam and air is introduced into said turbine; and f) means for regulating the flow rate of said second portion of said compressed air by regulating the flow rate of said steam mixed therein.

13. The gas turbine according to claim 12, wherein said regulating means comprises control means responsive to a drop in pressure of said second portion of said compressed air as said air is directed to said turbine.

14. The gas turbine according to claim 12, wherein said regulating means comprises:

a) means for creating a pressure drop in said second portion of said compressed air as said air is being directed to said turbine; and b) means for sensing said pressure drop.

15. The gas turbine according to claim 12, wherein:

a) said means for directing a second portion of said compressed air to said turbine comprises a first conduit;

b) said means for mixing said flow of steam into said second portion of said compressed air comprises a second conduit; and e) said regulating means comprises a valve in said second conduit, there being no valve in said first conduit.

16. The gas turbine according to claim 12, wherein:

a) said means for directing a second portion of said compressed air to said turbine comprises a first conduit;

b) said means for mixing said flow of steam into said second portion of said compressed air comprises a second conduit; and e) said regulating means comprises a third conduit receiving both said second portion of said compressed air from said first conduit and said flow of steam from said second conduit, whereby the pressure in said second conduit is a function of the flow rate of said steam and said compressed air, and whereby the flow rate of said second portion of said compressed air is a function of said pressure in said second conduit.

17. A method of cooling in a gas turbine power plant, comprising the steps of:

a) compressing air in a compressor, thereby producing compressed air;

b) heating a first portion of said compressed air by burning a fuel therein in a combustor, thereby producing a hot compressed gas;

c) flowing said hot compressed gas through a turbine so as to expand said hot compressed gas, thereby producing an expanded gas and power;

d) directing a second portion of said compressed air to said turbine, whereby said second portion of said compressed air bypasses said combustor, and introducing said second portion of said compressed air into said turbine for cooling thereof;

e) mixing a flow of steam into said second portion of said compressed air prior to said introduction of said second portion of said compressed air into said turbine, whereby a mixture of steam and air is introduced into said turbine;

f) regulating the flow rate of said second portion of said compressed air by regulating the flow rate of said steam mixed therein.

18. The cooling method according to claim 17, further comprising the step of flowing said mixture of steam and air introduced into said turbine through a plurality of cooling passages formed therein.

19. The cooling method according to claim 18, further comprising the step of discharging said mixture of steam and air into said hot compressed gas flowing through said turbine after said mixture has flowed through said cooling passages.

20. The cooling method according to claim 17, wherein said steam forms at least 90% of said mixture of steam and air on a weight basis.

21. The cooling method according to claim 17, further comprising the step of generating said flow of steam by transferring heat from said expanded gas to water.

22. The cooling method according to claim 17, further comprising the steps of:

a) directing said flow of steam to said second portion of said compressed air for mixing therein by flowing said steam through a pipe; and b) circulating steam through said pipe so as to heat said pipe prior to directing said flow of steam to said second portion of said compressed air through said pipe.

* * * * *